(12) United States Patent
Tiemann

(10) Patent No.: US 6,632,070 B1
(45) Date of Patent: Oct. 14, 2003

(54) GUIDE BLADE AND GUIDE BLADE RING FOR A TURBOMACHINE, AND ALSO COMPONENT FOR BOUNDING A FLOW DUCT

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,213
(22) PCT Filed: Mar. 21, 2000
(86) PCT No.: PCT/EP00/02499

§ 371 (c)(1),
(2), (4) Date: Sep. 24, 2001

(87) PCT Pub. No.: WO00/57032

PCT Pub. Date: Sep. 28, 2000

(30) Foreign Application Priority Data

Mar. 24, 1999 (GB) .......................................... 99105966

(51) Int. Cl.⁷ .................................................. F03B 3/16
(52) U.S. Cl. .................. 415/191; 415/209.2; 415/210.1
(58) Field of Search ................................. 415/138, 139, 415/191, 208.2, 209.2, 210.1

(56) References Cited

U.S. PATENT DOCUMENTS

| | | | |
|---|---|---|---|
| 2,715,968 A | 8/1955 | Davis et al. | |
| 2,873,088 A | 2/1959 | Neumann | |
| 3,008,689 A | 11/1961 | Morley et al. | |
| 3,104,093 A | 9/1963 | Craig et al. | |
| 3,294,364 A | 12/1966 | Stanley | |
| 3,309,058 A | 3/1967 | Blachurst et al. | |
| 5,244,345 A | 9/1993 | Curtis | |
| 6,460,343 B1 * | 10/2002 | Rakhmailov | 60/776 |

* cited by examiner

Primary Examiner—Edward K. Look
Assistant Examiner—Kimya N McCoy
(74) Attorney, Agent, or Firm—Harness, Dickey & Pierce, P.L.C.

(57) ABSTRACT

The invention relates to a guide vane (17) for a turbomachine (1), in particular a gas turbine guide vane, in which the platform (48) has a separating region (50), which is embodied as a separate component. This has, in particular, advantages with respect to the simplification of cast blade/vane (17) in terms of manufacturing technology, with respect to the variability of a material selection, the quality of a protective coating to be applied and efficient cooling.

22 Claims, 4 Drawing Sheets

GUIDE BLADE AND GUIDE BLADE RING FOR A TURBOMACHINE, AND ALSO COMPONENT FOR BOUNDING A FLOW DUCT

This application is the national phase under 35 U.S.C. §371 of PCT International Application No. PCT/EP00/02499 which has an International filing date of Mar. 21, 2000, which designated the United States of America, the entire contents of which are hereby incorporated by reference.

FIELD OF THE INVENTION

The invention relates to a guide blade for a turbomachine, preferably for a turbine and even more preferably a gas turbine, for use, for example, in a power station for generating electricity. The invention also preferably relates to a guide blade ring made up of such guide blades. The invention relates, even more preferably, to a component for bounding a flow duct in a turbomachine.

BACKGROUND OF THE INVENTION

Such a gas turbine has a shaft or a rotor to which so-called rotor blades are permanently connected. The rotor blades extend in the radial direction into a flow duct of the turbine. A plurality of rotor blades form a rotor blade ring in the peripheral direction of the rotor. A plurality of rotor blade rings are arranged at a distance from one another in the longitudinal direction of the rotor. So-called guide vanes, which extend in the radial direction from, the outside into the flow duct, are arranged on the turbine casing. The guide vanes are likewise arranged in guide vane rings, the individual guide vane rings meshing with the rotor blade rings in the manner of teeth. In contrast to the rotor blades, the guide vanes are solidly and immovably fastened on the casing.

The flow duct enclosed between the rotor blades and the guide vanes is bounded by the guide vanes and rotor blades and is sealed toward the outside. For this purpose, both the rotor blades and the guide vanes have, as a rule, a so-called platform in the region of their blade/vane root, with which they are fastened to the rotor or to the casing. This platform extends essentially at right angles to their blade/vane aerofoil, which protrudes radially into the flow duct.

Very high temperatures occur, particularly in the case of gas turbines in the field of electricity generation. Efforts are made to achieve continually higher gas temperatures in the course of efficiency increases. This increases the demands made on the materials used and on the cooling, which is generally necessary, of the individual components of the gas turbine.

An impingement cooling system for a gas turbine blade/vane is revealed in DE 26 28 807 A1. The gas turbine blade/vane is aligned along a blade/vane axis and has a blade/vane aerofoil and a platform region along the blade/vane axis. In the platform region, the platform extends transverse to the blade/vane axis away from the blade/vane aerofoil outward approximately at right angles. In this way, the platform forms a part of the flow duct for a working fluid (hot gas), which flows through the gas turbine. Due to the very high temperatures in the flow duct, the surface of the platform exposed to the hot gas is subjected to severe thermal effects. In order to cool the platform, a perforated wall element is arranged in front of the surface of the platform facing away from the hot gas. Cooling air enters via the holes in the wall element and meets the surface of the platform facing away from the hot gas. This achieves efficient impingement cooling.

WO 97/12125 A1 shows a sealing element for sealing a gap between components of a gas turbine installation. Two blades/vanes directly adjacent to one another in a blade/vane ring have mutually opposite grooves on opposing edges of their platforms. A sealing element is inserted into these grooves. A gap between the platforms is sealed by this sealing element. At the same time, however, the platforms are not rigidly connected to one another so that sufficient clearance remains for thermal expansions in particular. The sealing element has a profiled surface area and this provides an improved sealing effect.

In addition to being subjected to thermal effects, the rotor blades must withstand high centrifugal forces during operation because of the rotational speed of the rotor. This applies particularly to turbines which are employed as propulsion engines or propulsion turbines, for example in the aeronautical field. Particularly high rotational speeds are provided for such propulsion turbines. Because of the high centrifugal forces associated with the high rotational speeds, efforts are made to achieve the lowest possible mass of the rotor blades, particularly in the case of these propulsion turbines. For this purpose, U.S. Pat. No. 3,294,364 proposes separating the platform from the individual guide blades, i.e. to dispense with an integral unit, consisting of rotor blades and platform, and its advantages. For the multi-part configuration demands, as compared with the integral unit, increased complexity and therefore increased time and cost requirements during the assembly of the rotor blades in the turbine. The separation between the platform and the actual rotor blade is, for example, known from U.S. Pat. No. 5,244,345.

SUMMARY OF THE INVENTION

An object of the invention is to provide a guide blade for a turbomachine which can be manufactured simply and at favorable cost. A further object of the invention is to provide a guide blade ring made up of such guide blades and to provide a component for bounding a flow duct in a turbomachine.

According to the invention, the object directed towards the guide blade is achieved by means of a guide blade for a turbomachine, which guide blade is aligned along a blade/vane axis and has a blade/vane aerofoil arrangement, a fastening region and a platform region arranged between the blade/vane aerofoil region and the fastening region. The platform region is preferably designed to receive a separating region which can be separated non-destructively from the guide blade. The separating region is preferably part of a platform, which is associated with the platform region, for bounding a flow duct in the turbomachine.

The guide blade is therefore no longer configured integrally, as was previously usual in the case of guide blades, but has a platform region which can be separated—the separating region. This multi-part design therefore initiates a new way of constructing guide blades. In contrast to the rotor blades for aircraft turbines, for which such a multi-part construction is known, the construction does not appear to be appropriate for guide blades of a gas turbine in the field of electricity generation. On the one hand, there are of course no centrifugal forces in the case of the guide blades and, on the other, the assembly complexity and therefore the expenditure of time and cost are disadvantageously influenced by the multi-part construction.

In a surprising manner, however, the multi-part design leads to a marked simplification of the manufacturing process for the guide blade per se. Particularly in the case of one-piece cast guide blades, this is due to the casting process being very much simpler because at least part of the platform, which usually protrudes at right angles to the blade/vane axis, does not have to be cast at the same time. This results in a casting mold which is very much simpler to handle and manufacture. This simplification of the casting process is important, particularly in the case of single-crystal or directionally solidified guide blades. Such guide blades have very good material properties. Because attempts are made to achieve continually higher operating temperatures for gas turbines in the field of electricity generation, it is usually only possible to employ such high-quality guide blades.

A further essential advantage of the multi-part configuration for the manufacturing process may be seen in the fact that the individual parts have clearly simplified geometry as compared with the integral configuration. This permits the application of a high-quality coating which protects the turbine guide blades from damage, in particular from thermal damage due to the desired high temperatures. In the case of the integral configuration, a high-quality and enduring coating is only possible with great difficulty in the transition region between the blade/vane aerofoil and the platform extending essentially at right angles to it because, in this transition region, it is almost impossible to achieve a uniform coating, such as is possible in the case of a simple geometry, in particular in the case of a flat shape.

Material pairing is, furthermore, at best only possible in a very limited manner in the case of an integral design. For both reasons, cost and the different, in particular thermal, demands made on the various blade/vane regions, however, it can be advantageous to use different materials for various regions of the blade/vane. This applies particularly to the platform. Because of the independent embodiment of at least a part of the platform as a separating region, this separating region can be manufactured from a material which is different from the rest of the blade/vane material. Manufacture with an independent separating region is of particular advantage in the case of a guide blade, in which the platform has to receive, at most, a small part of loads which occur during an employment of the guide blades in a turbomachine. The fastening region is then advantageously configured in such a way that it receives the essential part of these loads. Because of this, no particular measures have to be taken for a particularly stable and permanent connection when attaching the separating region at the platform region.

The separating region can be advantageously attached by means of a blading-side edge, with the platform region and the blading-side edge being configured in such a way that they mesh together, in particular over the complete length of the blading-side edge, when the separating region is attached.

Such meshing together achieves good fixing of the separating region on the platform region. In addition, meshing together seals the separating region and the platform region against a working medium or against a cooling medium. The working medium, in particular hot gas, is guided within the flow duct of the turbomachine whereas the cooling medium for cooling the platform flows onto the platform on the surface remote from the flow duct surface.

In addition, the blading-side edge and the platform region preferably mesh together as groove and tongue. This is particularly simple from the point of view of manufacturing technology and also permits simple installation of the blade/vane in the turbomachine.

An intermediate piece can be advantageously introduced between the platform region and the blading-side edge, which intermediate piece seals a gap, which remains between the separating region and the platform region after the attachment of the separating region. A gap remaining between the platform region and the separating region is therefore sealed, by means of such an intermediate piece, against entry of the working medium flowing in the flow duct. The intermediate piece can also, however, reduce or prevent entry of a cooling medium into the flow duct. In addition, a mechanical fixing of the separating region on the platform region can also be achieved by means of the intermediate piece. This is preferably achieved by both the blading-side edge and the platform region having a groove. These grooves are located opposite to one another during an attachment of the separating region. The intermediate piece can be laid in the grooves, in particular over the complete groove length. When the separating region is attached, therefore, the two opposing grooves form a channel into which the intermediate piece is introduced. This corresponds to the arrangement of the sealing element between the platforms of two adjacent blades/vanes, as follows from WO 97/12125 A1 cited further above.

The platform advantageously has an area extension, the separating region having a proportion more than 70% of this area extension. In consequence, a major part of the platform is configured in the form of the separating region. More than 90% of the platform is preferably configured as the separating region. The platform is therefore an independent component to a major or even almost complete extent.

A stiffening rib preferably extends from the separating region, in particular approximately at right angles to an area extent of the separating region. This stiffening rib is connected to the fastening region when the separating region is attached. Such a stiffening rib serves to provide an additional mechanical stabilization of the platform in the turbomachine. The stiffening rib preferably meshes into the fastening region, and in particular—as described for the separating region and the platform region—by means of a groove and tongue configuration or by means of an intermediate piece introduced into the opposing grooves. By this means, the separating region is also fixed to the fastening region in addition to being fixed on the platform region. An extension approximately at right angles of the stiffening rib relative to the area extension of the separating region provides mechanical fixing in a direction approximately at right angles to the fixing direction in the platform region.

The guide blade is preferably designed as a gas turbine guide blade of a gas turbine in a power station for generating electricity. As already mentioned, the gas turbine guide blade is subjected to particularly severe thermal effects due to the hot gas flowing in the flow duct, i.e. the hot gas duct. The platform, too, is subject to these severe thermal effects. The at least partially separate design of the platform as an independent component, the separating region, immediately achieves several advantages, of which the essential ones are briefly summarized once again:

1. The separating region can be manufactured from a material which is different from the material of the rest of the guide blade because it does not have to be cast together with the rest of the guide blade. As an example, the separating region can be manufactured from a ceramic material. The separating region can also include a metallic material, or an alloy, which is different from the material of the rest of the guide blade.

2. Gas turbine guide blades are frequently provided with a coating system for protection against oxidation and/or corrosion and for protection against overheating. Due to the separate embodiment of the separating region, a different coating system can be provided for the separating region and for the rest of the vane to match different thermal effects. In addition, this coating can be applied more simply and with a higher quality because the blade/vane and the separating region can be respectively coated separately. Particularly in the case of plasma spraying, it is important to align the surface to be coated as nearly as possible at right angles to the plasma beam. In the case of oblique spraying, increased porosity occurs on the coating and, therefore, increased susceptibility to flaking. The separate embodiment of guide blade and platform by means of the separating region makes it possible to place both the guide blade and the separating region substantially at right angles to the plasma jet during the coating operation.

3. The platform cooling is frequently effected by arranging impingement cooling sheets on the side of the platform remote from the hot gas duct. Such sheets have openings by means of which the cooling air is fed at right angles onto the platform surface to be cooled. In the case of a guide vane with a completely integral configuration, it can be difficult to apply such impingement cooling sheets. Problems particularly occur when a double platform is provided. In the double platform, a platform part on the hot gas side undertakes the screening from the hot gas whereas a load-carrying platform part opposite, in the radial direction, to this platform part on the hot gas side undertakes the receiving of the load. In such a double-platform concept, relatively little space remains between the platform parts so that welding on platform cooling sheets is complex and difficult. In the case of a separating region which is separate, these difficulties do not arise because the separating region can be provided with impingement cooling sheets or further means, for example turbulators or ribs, in a simple manner and independently of the rest of the blade/vane.

4. The transition region between the blade/vane aerofoil and the platform is a critical region with respect to the thermal effects because radiusing, and therefore an accumulation of material, occurs in this region. This transition region is difficult to cool and, because of the accumulation of material, is subjected to particularly severe thermal stresses at the same time. Due to the separate embodiment of the separating region, this transition region can now be cooled effectively and in a simple manner. This takes place by feeding cooling air through a gap between the separating region and the platform region. The cooling air therefore flows through this gap directly past the critical transition region and cools the latter in the process.

According to the invention, the object directed toward a guide blade ring is achieved by means of a guide blade ring with guide blades according to one of the above embodiments, the separating region respectively associated with a guide blade being arranged between two guide blades immediately adjacent to one another.

That part of the platform which is located in each case between two adjacent guide blades is therefore configured as a separating region. The complete guide blade ring is therefore built up from guide blades with separating regions introduced separately between them. The advantages of such an assembly follow in a manner corresponding to the above statements with respect to the advantages of the guide blades.

Two guide blades immediately adjacent to one another are preferably associated respectively with a single, common separating region. In consequence, each of the two guide blades share a separating region located between them. In other words, each two guide blades have a common platform region which is located between them. This results, in particular, in a simplification with respect to manufacture technology because the number of components is reduced.

According to the invention, the object directed toward a component is achieved by a component for bounding a flow duct in a turbomachine, which component can be introduced between two immediately adjacent guide blades of a guide blade ring and can be connected to these guide blades.

BRIEF DESCRIPTION OF THE DRAWINGS

Embodiment examples of the invention are explained in more detail using the drawing. In this, diagrammatically in part and not to scale.

SIMILAR DESIGNATIONS HAVE THE SAME SIGNIFICANCE IN THE VARIOUS FIGURES.

DETAILED DESCRIPTION OF THE PREFERRED EMBODIMENTS

Figure 1:
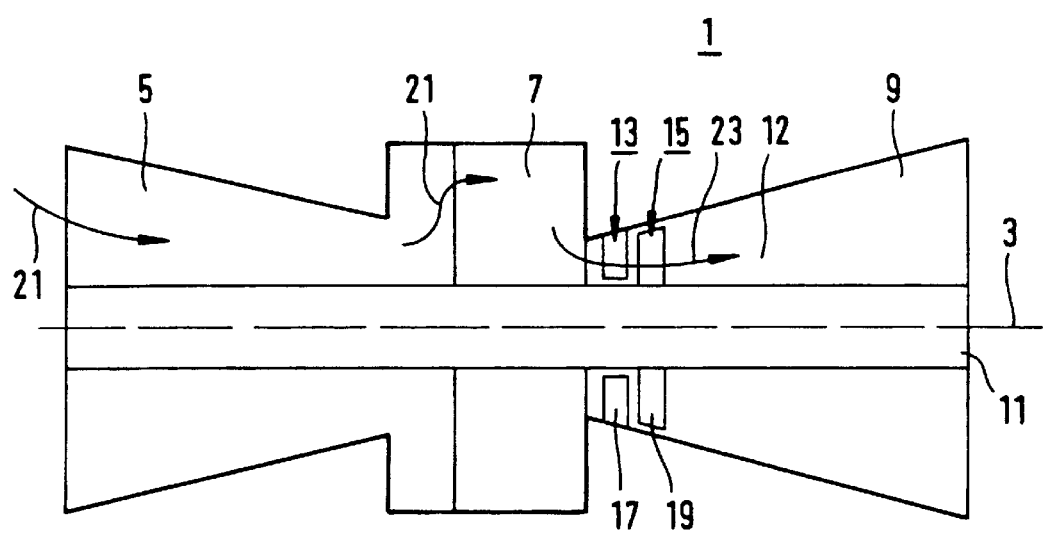
FIG. 1 shows a gas turbine.

FIG. 1 shows a gas turbine 1 such, for example, as is employed in the field of electricity generation in a power station. A compressor 5, a combustion chamber 7 and a turbine part 9 are arranged sequentially along a turbine center line 3. The compressor 5 and the turbine part 9 are arranged on a common shaft 11. In the case of a power station, the shaft 11 is connected to a generator (not shown here) for generating electrical energy. A flow duct 12 is provided in the turbine part 9. Guide blade rings 13 and rotor blade rings 15, of which only one ring is shown as an example in each case, are arranged alternately in sequence in the flow duct 12 along the turbine center line 3. Each guide blade ring 13 is built up from gas turbine guide blades 17. Each rotor blade ring 13 is built up of gas turbine rotor blades 19.

During operation of the gas turbine 1, ambient air 21 is compressed in the compressor 5 and supplied to the combustion chamber 7. There, it is burnt along with fuel being supplied. The resulting hot exhaust gas 23 (also designated as hot gas) is led through the flow duct 12. A reduction in pressure occurs during this procedure. The potential energy released in the process is transferred as kinetic energy via the guide blades 17 and the rotor blades 19 to the shaft 11, which is provided with a rotational motion. The components in the flow duct 12, in particular the gas turbine guide blades 17 and the gas turbine rotor blades 19, are subjected to severe thermal effects due to the hot exhaust gas 23.

Figure 2:
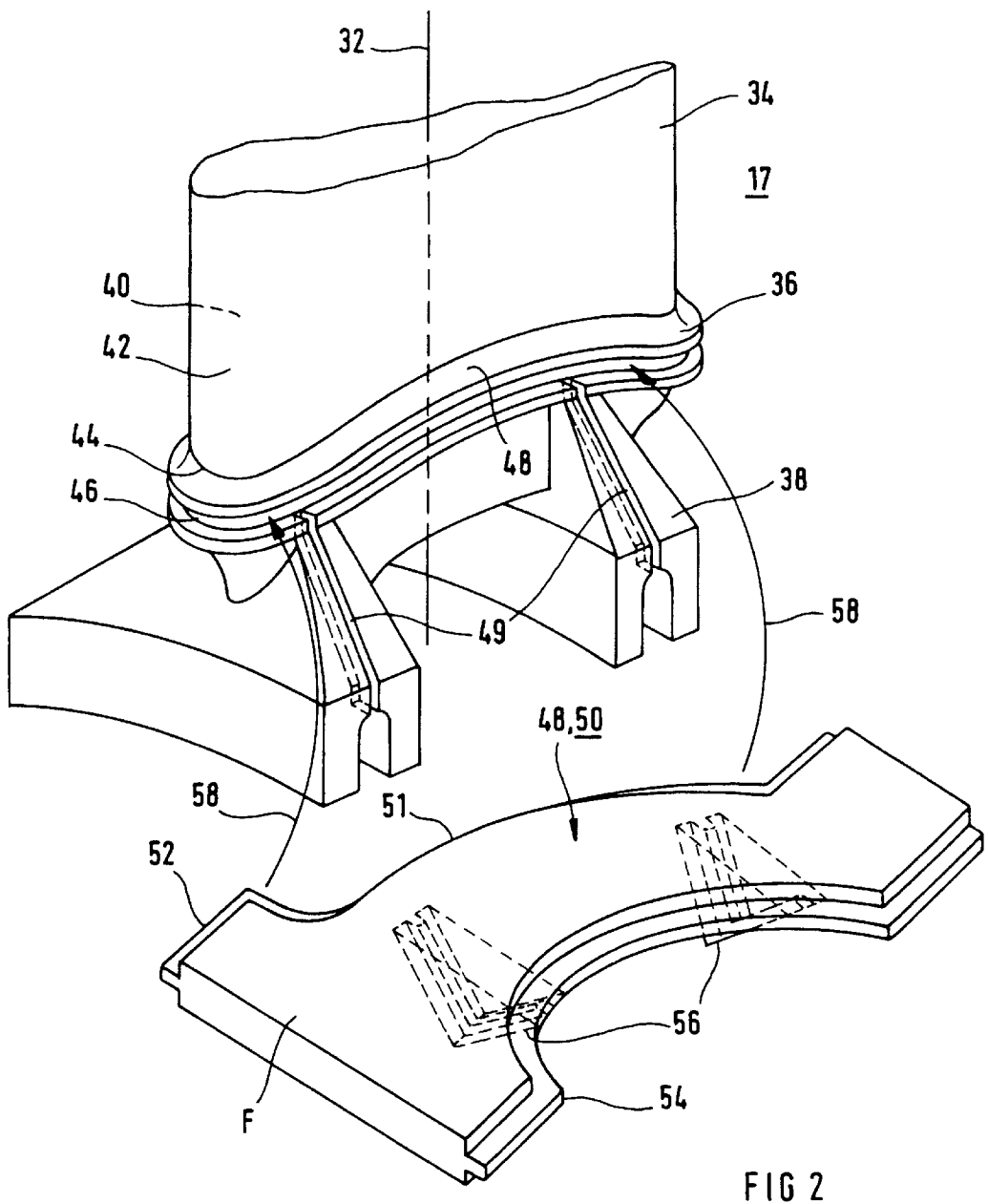
FIG. 2 shows a part of a gas turbine guide blade in perspective view.

FIG. 2 shows, in perspective view, a part of a gas turbine guide blade 17. A blade/vane aerofoil region 34, a platform region 36 and a fastening region 38 are arranged sequentially along a blade/vane axis 32. When the gas turbine guide blade 17 is installed in a gas turbine 1, the blade/vane aerofoil region 34 protrudes into the flow duct 12. The fastening region 38 is used for fastening the gas turbine guide blade 17 in the gas turbine 1. The blade/vane aerofoil region 34 has a suction surface 40 and a pressure surface 42. The blade/vane aerofoil region 34 merges into the platform region 36 in a radiused transition region 44.

The platform region 36 includes a platform 48, which extends at right angles to the blade/vane axis 32 and which, when the gas turbine guide blade 17 is installed in the gas turbine 1, partially bounds the flow duct 12. The platform 48 is essentially configured as a separate component, namely as a separating region 50. In the platform region 36, a groove 46 extends approximately at right angles to the blade/vane axis 32 and so that it follows the contour of the blade/vane aerofoil region 34. Matching this groove 46, a tongue 52, i.e. a protrusion 52 which extends along the blading-side edge 51 and which can be introduced as an accurate fit into the groove 46, is arranged on a blading-side edge 51 of the separating region 50. Groove and tongue can also be exchanged, i.e. the separating region 50 has the groove 46 and the platform region 36 has the tongue 52.

The separating region 50 has an area extension F. Ribs 56 are arranged on the lower surface of the separating region 50 and approximately at right angles to this area extension F. When the separating region 50 is attached to the platform region 36, the blading-side edge 51 of the separating region 50 meshes, by means of the tongue 52, with the groove 46. This attachment of the separating region 50 is represented by the arrows 58. At the same time, the ribs 56 come into coincidence with grooves 49 in the fastening region 38 and are connected in the fastening region 38 with an appropriate connector (not shown in any more detail). Such a connector can, for example, be an intermediate piece 82 described in more detail by means of FIG. 4. Additional stiffening of the connection between separating region 50 and platform region 36 is achieved by means of the ribs 56. The fastening region 38 is configured in such a way that it receives the essential part of the forces which are exerted on the gas turbine guide blade 17 during operation of the gas turbine 1. Essentially, therefore, the separating region 50 is used only for screening from the hot exhaust gas 23 in the flow duct 12, i.e. for bounding the flow duct 12.

The separated embodiment of the separating region 50 as a separate component provides substantial simplification from the point of view of manufacturing technology, particularly in the case of a cast gas turbine guide blade 17, because a platform 48 which protrudes at right angles makes the casting process more complicated and more expensive. In addition, the separating region 50 can be embodied in an arbitrary material matched to the requirements at the platform 48 independently of the rest of the gas turbine guide blade 17. In addition, the separating region 50 can be provided with a coating which may differ from the coating of the rest of the gas turbine guide blade 17. Furthermore, this coating can be applied, for example in the case of plasma spraying, in a high-quality manner because the separating region 50 can be oriented in an optimum manner during the coating process independently of the rest of the gas turbine guide blade 17. In addition, the transition region 44 between the blade/vane aerofoil region 34 and the platform region 36 can be effectively cooled because cooling air can be led between the separating region 50 and the platform region 36 through the groove 46 and past the edge 52 to the transition region 44, where it effectively cools the transition region 44. It is precisely the transition region 44 which, because of material thickening, presents a critical location with respect to thermal stresses.

Figure 3:
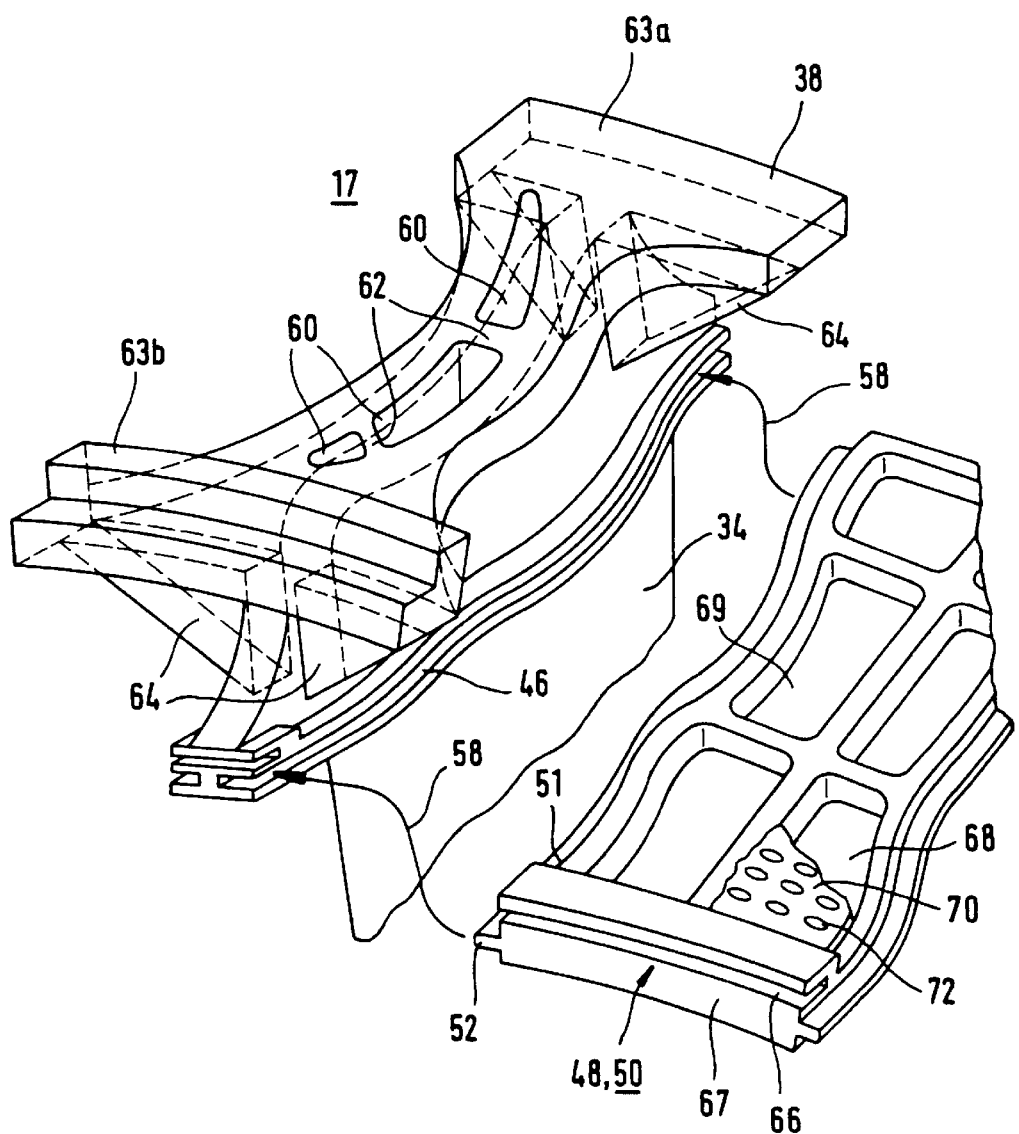
FIG. 3 shows another embodiment of a gas turbine guide blade in perspective view.

FIG. 3 shows, in perspective view, a further design of a gas turbine guide blade 17. In this representation, it can be seen that the gas turbine guide blade 17 has a hollow space 60 which extends through the gas turbine guide blade 17 and along the blade/vane center line 32. Stiffening ribs 62 are arranged within the hollow space 60. The fastening region 38 has mutually opposed hook-on edges 63a and 63b. These hook-on edges 63a and 63b are used to fasten the gas turbine guide blade 17 in the gas turbine 1. The hook-on edges 63a and 63b are stiffened by means of stiffening ribs 64. A separating region 50 forming the platform 48 can, as already described in FIG. 2, be connected to the rest of the gas turbine guide blade 17. The separating region 50 has, on the cold side 69 opposite to the hot-gas side (and visible in this representation), impingement cooling pockets 68 over which is arranged an impingement cooling sheet 70 with impingement cooling openings 72. These cooling means can be applied particularly simply due to the separate embodiment of the separating region 50. A groove 66, which extends approximately at right angles to the blading-side edge 51 in an end region 67 of the separating region 50 is used, corresponding to the fastening of the separating region 50 in the platform region 36, for fastening the separating region 50 onto a further component (not shown here in any more detail) of the gas turbine 1.

Figure 4:
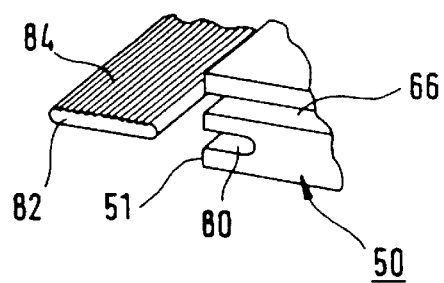
FIG. 4 shows an excerpt from a connection location between a separating region and a platform region.

FIG. 4 shows, in perspective and as excerpt, a further possibility for the mechanical fixing of the separating region 50 on the platform region 36. In contrast to fixing in accordance with the groove and tongue principle, such as is represented in FIGS. 2 and 3, FIG. 4 shows fastening by way of an intermediate piece 82, which is laid both in a groove 80 of the separating region 50 on the blading-side edge 51 and in the groove 46 of the platform region 36. The intermediate piece 82 has, in addition, a profiled surface 84 through which a sealing effect is increased. Such a sealing effect is used for sealing a gap between the separating region 50 and the platform region 38 against the hot exhaust gas 23 in the flow duct 12. This is represented in more detail in FIG. 5.

Figure 5:
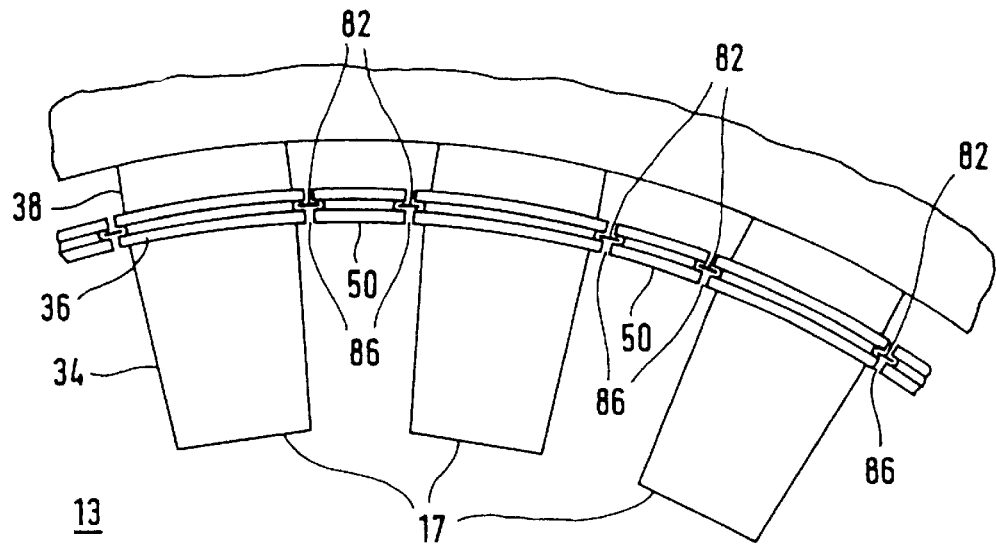
FIG. 5 shows an end view onto a guide blade ring of a gas turbine.

FIG. 5 shows, in a plan view, an excerpt from a guide blade ring 13. Each two gas turbine guide blades 17 directly adjacent to one another share a separating region 50 located between them in the peripheral direction of the guide blade ring 13. A gap 86 is located between the separating regions 50 and the platform regions 36 of the respective gas turbine guide vanes 17. This is sealed against penetration of the hot exhaust gas 23 from the flow duct 12 by the intermediate piece 82, as shown in FIG. 4. The embodiment of the separating region 50 as a common separating region 50 for each two blades reduces the number of components and, by this means, achieves a further simplification from the point of view of manufacturing technology.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A guide blade, for a machine, comprising:
   an aerofoil region;
   a fastening region;
   a platform region, wherein the platform region is designed to accept a separating region, non-destructively separable from the blade, the separating region being part of a platform associated with the platform region, for bounding a flow duct in the machine; and
   a stiffening rib, connected from the separating region to the fastening region.

2. The guide blade as claimed in claim 1, wherein the separating region is attachable using a blading-side edge, to the platform region, the blading-side edge and the platform region being configured so as to mesh together when the separating region is attached.

3. The guide blade as claimed in claim 2, wherein the blading-side edge and the platform region mesh together in a groove and tongue manner.

4. The guide blade as claimed in claim 2, further comprising:
    an intermediate piece, between the platform region and the blading-side edge, for sealing a gap, remaining after attachment of the separating region and the platform region.

5. The guide blade as claimed in claim 4, wherein both the blading-side edge and the platform region include a groove, the grooves being opposite to one another when attaching the separating region, wherein the intermediate piece can be laid in the grooves.

6. The guide blade of claim 5, wherein the intermediate piece can be laid over the complete length of the grooves.

7. The guide blade as claimed in claim 2, wherein the platform includes an area extension, the separating region including more than 70% of this area extension.

8. A guide blade ring comprising a plurality of guide blades as claimed in claim 2, and a separating region, arranged between two immediately adjacent guide blades.

9. The guide blade ring as claimed in claim 8, wherein only one separating region is arranged between two guide blades immediately adjacent to one another.

10. The guide blade as claimed in claim 1, wherein the platform includes an area extension, the separating region including more than 70% of this area extension.

11. The guide blade of claim 10, wherein the separating region includes more than 90% of the extension.

12. A guide blade ring comprising a plurality of guide blades as claimed in claim 1 and a separating region, arranged between two immediately adjacent guide blades.

13. The guide blade ring as claimed in claim 12, wherein only one separating region is arranged between two guide blades immediately adjacent to one another.

14. The guide blade of claim 1, wherein the guide blade is for an electricity generation turbomachine.

15. The guide blade of claim 1, wherein the stiffening rib is connected approximately at right angles to an area extent of the separating region.

16. The guide blade of claim 1, wherein the guide blade is for a fluid flow machine.

17. A fluid flow machine including the guide blade of claim 1.

18. A gas turbine including the guide blade of claim 1.

19. A guide blade, for a machine, comprising:

an aerofoil region;

a fastening region;

a platform region, wherein the platform region is designed to accept a separating region, non-destructively separable from the blade, the separating region being part of a platform associated with the platform region, for bounding a flow duct in the machine; and an intermediate piece, between the platform region and the separating region, for sealing a gap, remaining after attachment of the separating region and the platform region.

20. A guide blade, for a machine, comprising:

an aerofoil region;

a fastening region; and a platform region, wherein the platform region is designed to accept a separating region, non-destructively separable from the blade, the separating region being part of a platform associated with the platform region, for bounding a flow duct in the machine, wherein the guide blade is a single crystal guide blade.

21. A guide blade, for a machine, comprising:

an aerofoil region;

a fastening region; and a platform region, wherein the platform region is designed to accept a separating region, non-destructively separable from the blade, the separating region being part of a platform associated with the platform region, for bounding a flow duct in the machine, wherein the guide blade is directionally solidified.

22. The guide blade as claimed in claim 21, further comprising:

a stiffening rib, connected from the separating region to the fastening region.

* * * * *